United States Patent [19]
Gabrysch et al.

[11] Patent Number: 5,602,083
[45] Date of Patent: Feb. 11, 1997

[54] USE OF SIZED SALTS AS BRIDGING AGENT FOR OIL BASED FLUIDS

[75] Inventors: Allen Gabrysch, Houston; Billy G. Chesser, Spring, both of Tex.

[73] Assignee: Baker Hughes Inc., Houston, Tex.

[21] Appl. No.: 414,482

[22] Filed: Mar. 31, 1995

[51] Int. Cl.$^6$ .................. E21B 43/00; E21B 33/138; E21B 43/267
[52] U.S. Cl. .................. 507/200; 166/292; 166/305; 166/312; 166/282; 507/108; 507/140; 507/276; 507/269
[58] Field of Search .................. 507/200, 108; 166/292; 252/8.55 R

[56] References Cited

U.S. PATENT DOCUMENTS

| | | | |
|---|---|---|---|
| 4,046,197 | 9/1977 | Bruesbeck, Jr. et al. | 166/305 R |
| 4,175,042 | 11/1979 | Mondshine | 252/8.55 R |
| 4,186,803 | 2/1980 | Mondshine | 252/8.55 R |
| 4,822,500 | 4/1989 | Dobson, Jr. et al. | 252/8.551 |
| 5,228,524 | 7/1993 | Johnson et al. | 175/72 |
| 5,325,921 | 7/1994 | Johnson et al. | 166/280 |

FOREIGN PATENT DOCUMENTS

| | | |
|---|---|---|
| 0673985 | 9/1995 | European Pat. Off. . |
| 9524452 | 9/1995 | WIPO . |

*Primary Examiner*—David B. Springer
*Attorney, Agent, or Firm*—Rosenblatt & Redano, P.C.

[57] ABSTRACT

An oil-based fluid system has been discovered using a distribution of salt particle sizes, an oil or water/oil emulsion, a suspending agent for suspending the salt particles in the oil and a filtration control agent. It is important that the salt particles be distributed across a wide size range to effectively prevent filtration or fluid loss into the formation. Since the filter cake particles do not invade the well bore, no high pressure spike occurs during the removal of the filter cake. This high pressure spike indicates damage to the formation and well bore surface, which damage typically reduces overall permeability of the formation. The rheological properties of the fluid allow it to be used in a number of applications where protection of the original permeable formation is desirable. The applications include, but are not limited to, drilling fracturing and controlling fluid losses during completion operations, such as gravel packing or well bore workovers.

23 Claims, No Drawings

USE OF SIZED SALTS AS BRIDGING AGENT FOR OIL BASED FLUIDS

FIELD OF THE INVENTION

The invention relates to oil-based fluid or mud systems for use in controlling fluid losses during hydrocarbon recovery processes, such as drilling, fracturing, gravel packing and well bore workovers, and more particularly relates to such fluids, in one aspect, which form a durable, thin filter cake, but which is easy to remove and results in little damage to the permeability of the formation.

BACKGROUND OF THE INVENTION

Horizontal wells drilled and completed in unconsolidated sand reservoirs have become feasible recently, due to new technology and completion methods. Wells of this type require sand control, for example such as long open hole gravel packs or the installation of mechanical sand exclusion devices (slotted liners, prepacked screens, etc.). Successful wells have been completed with horizontal techniques, producing intervals as long as 1800 ft. (550 m) using these methods of sand control.

Usually the wells are drilled with conventional drilling muds to the top of the pay zone and casing is set. The cement is then drilled out to the casing shoe and the shoe is tested. The drilling mud is then displaced with a "low damage potential drilling fluid" generally consisting of polymers, viscosity enhancers and particles for building a filter cake. The particles are usually graded salt (NaCl) or graded calcium carbonate ($CaCO_3$). These compounds are used because they are soluble in undersaturated brines or hydrochloric acid.

After the open hole interval has been drilled to total depth, the gravel pack screen or sand exclusion device is placed in the open hole interval. To do this it becomes necessary to circulate the drilling fluid from the open hole so that the well can be gravel packed or the sand exclusion setting can be tested. Displacement of the drilling fluid with a solids-free completion brine is necessary. Concern about the physical erosion of the filter cake with the completion fluid is also always an issue. That is, the filter cake should be durable and stable enough to permit the completion or other operation to take place and protect the well bore during the entire operation.

The ideal drilling mud or drill-in fluid would mechanically seal all pore openings exposed to the well bore, stay intact during completion operations, then be easily removed by production of oil or gas. Problems arise in designing these fluids or muds because production zones vary in pressure, permeability, porosity and formation configuration. It would be desirable if fluids could be devised which would easily form an impermeable filter cake to prevent the loss of expensive completion fluids to the formations and which effectively protects the original permeable formation during various completion operations such as gravel packing or well bore workovers. At the same time, however, it is also highly desirable for the filter cake to be easily removable at the beginning of production causing little or no damage to the formation.

Further, while the use of sized salt (e.g. sodium chloride) as a bridging agent in a saturated sodium chloride brine has been used extensively, the technique has disadvantages including (1) a minimum fluid density of 10.3 to 10.5 lb/gal; (2) a maximum temperature limitation of about 250° F; and (3) insufficient lubricating properties in many situations. It would be desirable particularly if these three problems could be minimized or reduced.

SUMMARY OF THE INVENTION

Accordingly, it is an object of the present invention to provide a fluid system which forms a durable, thin filter cake on the permeable formation and prevents fluid losses thereto.

It is another object of the present invention to provide a fluid system which forms a filter cake that can be easily removed with little or no damage to the formation.

It is yet another object of the invention to provide a fluid system for controlling fluid loss which has application during drilling, completion and stimulation of permeable reservoirs, during a variety of such operations such as gravel packing or well bore workovers which may have a fluid density below about 10.3 lb/gal and which may be used at a temperature of greater than 250° F.

In carrying out these and other objects of the invention, there is provided, in one form, an oil-based fluid system for controlling fluid losses during hydrocarbon recovery operations, which has an oil; a distribution of water soluble salt particle sizes; a suspending agent for suspending the salt particles in the oil; and a filtration control agent.

DETAILED DESCRIPTION OF THE INVENTION

It has been discovered that a sized salt, e.g. a graded calcium chloride, can be used as bridging agent in an oil external phase emulsion, where the internal phase is a saturated brine, for example, saturated with calcium chloride. By utilizing the sized salt as bridging particles in the oil-based system, subsequently undersaturated brines can be used as flushes to dissolve the salt bridge or filter cake, or produced water may be used to aid in its removal. An advantage of using a water soluble bridging agent is that particles which may remain after bringing the well on production are subject to removal by produced water. Since the oil-based fluids exhibit excellent lubricity, much higher temperature stability and good inhibition to clays and shales, they provide significant improvements over brine systems.

As noted, the fluid forms a very durable, thin cake that acts like a check valve on the permeable formation. The salt bridge or filter cake formed from the fluid of this invention is expected to exhibit little or no removal pressure spike, even when placed at high differential pressure. The filter cake from the inventive fluid is expected to be easy to remove and yields very low or minimal damage to the original permeability of the permeable formation. The rheological properties of this fluid allow it to be used in a number of applications where protection of the original permeable formation is desirable. For example, the applications include drilling, fracture packing, and controlling fluid losses during completion operations such as gravel packing or well bore workovers.

The fluid systems of this invention require four main components: (1) a distribution of salt particle sizes, also called a graded or sized salt; (2) an oil, which may include a water-in-oil (w/o) emulsion; (3) a suspending agent (also called viscosifier) for suspending the salt particles in the oil; and (4) a filtration control agent. Because fluids of different characteristics, such as different densities, etc. will have different requirements, it is difficult to specify with precision proportions of the components for all drilling fluids. Further, the expected temperature demands on the fluid will affect its necessary composition.

In one broad embodiment of the invention, the proportions of the various components range from about 0 to 60 vol. % saturated brine (if a w/o emulsion is used); from about 25 to 800 lbs/bbl salt particles of a specified size distribution; from about 2 to about 8 lb/bbl of suspending agent, also called a viscosifier; from about 2 to about 15 lb/bbl of a filtration control additive; where the balance is oil. Preferably, the proportions of the fluid components range from about 10 to 60 vol. % saturated brine; from about 50 to 800 lbs/bbl salt particles of a specified size distribution; from about 4 to about 6 lb/bbl of suspending agent; from about 4 to about 6 lb/bbl of a filtration control additive; where the balance is oil. In the case where a water-in-oil emulsion is used, an emulsifier is necessary. In one embodiment, the proportions of emulsifier in the above proportions ranges from about 0.25 to about 3 gal/bbl; more preferably the proportions range from about 1 to about 2 gal/bbl. Other ingredients may also be present in the drilling fluid system as long as they do not adversely affect the performance of the system. For example, suitable surfactants or wetting agents may be employed, however, in some situations it is desirable to avoid the incorporation of a surfactant.

It is important that the salt particles be graded so that their size distribution will be relatively broad or wide and result in a thin filter cake of extremely low permeability, and so that minimal invasion of particles and filtrate will occur when the filter cake forms on the borehole surface. That is, these drilling muds or drill-in fluids are specially designed systems to be used to drill a production zone with minimal damage to the formation and thus, the subsequent production of hydrocarbons. It will therefore be appreciated that the exact grading for a particular fluid will depend in large measure on the permeability characteristics of the formation. Generally, by the term "graded" it is meant that the salt particles have a certain defined size distribution. It has been discovered in the composition of this invention that the graded salt particles should have a relatively wide, rather than a narrow distribution of size.

Salts that may be used in this invention include, but are not necessarily limited to, alkali metal salts and alkali earth metal salts, for example sodium salts, such as sodium chloride and sodium bromide; potassium salts, such as potassium chloride and potassium bromide; and calcium salts, such as calcium chloride and calcium bromide; and the like. In one embodiment of the invention, calcium salts are preferred since in some cases the use of a surfactant can be avoided.

It is believed, without being limited to any one theory, that too narrow a distribution provides too many of the same size of particle which therefore tend to stack like marbles with interstices or spaces between the relatively uniform particles which permit fluid flow therethrough. By using a distribution of various sizes, the gaps between the larger particles are filled by the succeedingly smaller particles. Permeability and porosity are a function of the pore throat size of the particles making up the formation. Using one non-limiting example, if the average pore throat size of the particular formation is x, then the size of the particles used as the bridging particles in the filter cake might be x/6 or some other formula. However, as explained above, not all of the filter media particles should be x/6, but they should be distributed or graded about the x/6 point. For example, x/2 fluid particles would "bridge" across the spaces between the x grains of the formation. In turn, x/3 particles would bridge between the x/2, which in turn would be bridged by the x/4 particles and so forth (to and beyond less than x/6, to x/7, etc.) until complete blockage occurs. While this is an oversimplified illustration, it does explain why a fluid having a wide or graded distribution of salt particle sizes forms a more impermeable filter cake than one with a more narrow distribution and uniform particle size. It is also apparent that it is not possible to specify the exact size distribution of the particles in any given fluid, since the distribution depends on the average pore throat size of the formation where the fluid is to be used.

It has been demonstrated that the effects of "skin damage" (very shallow permeability damage into the formation from the well bore; total thickness of the damage layer: 0.1 ft.) on estimated production can be very minimal. If permeability is reduced by 50% in a small area space as in skin damage (0.5–0.6 ft invasion from the well bore), the overall effect on production is minor, only a 2.1% reduction occurs. On the other hand, if damage to the formation continues reducing the permeability deeper (e.g. from 0.5 to 10 ft into the formation), production can be lowered by 26%.

In one embodiment of the invention, the well bore is in a formation having a permeability, and where the permeability of the formation prior to injecting the fluid system is $K_i$ and the permeability of the formation after removing the filter cake from the well bore is $K_f$. Using the fluid loss system of this invention, $K_f/K_i$ is expected to range from 0.90 to 1.0, preferably from about 0.95 to 1.0. In many commercial systems, $K_f/K_i$ is much less than 0.9.

The oil used in these oil-based fluids may come from a variety of sources. It will be noted that in many of the Examples ISO-TEQ™ oil sold by Baker Hughes INTEQ, which is based on isomerized olefins manufactured by Chevron, are used. This is primarily because this oil is an environmentally acceptable oil with very low toxicity. However, mineral oils such as Exxon's Escaid™ 110 or Conoco's LVT™ oils, or even diesel oil can be used in preparing the systems.

The suspending agent may be any suitable viscosifier which effectively keeps the salt particles suspended in the oil. Of course, the viscosifiers may be used to increase the viscosity of the system as well. Suitable viscosifiers may include, but are not necessarily limited to various polymers, organophilic clays (or example, amine-treated bentonite, hectorite or attapulgite). Specific examples of suitable viscosifiers include, but are not limited to Carbo-Gel™, a hectorite-based viscosifier made by National Lead Corporation; and Carbo-Vis™, a bentonite-based viscosifier made by IMV. Latex-based viscosifiers such as Alcomer™ 274 or Dovermul™ made by Doverstrand may also be used to supplement the organophilic clays.

In the case where the oil phase encompasses an emulsion of oil and water, an emulsifier or mixture of emulsifiers that adequately accomplish the job are necessary. In some cases, it may be useful to employ a primary emulsifier and a secondary emulsifier, where the secondary emulsifier is used to enhance the properties of the primary emulsifiers. Some emulsifiers useful as secondary emulsifiers may also be effective as primary emulsifiers, and with many emulsifiers a secondary emulsifier may not be necessary. Suitable emulsifiers which may be used alone or together include but are not necessarily limited to oxidized tall oils and condensed amides, and the like. Specific examples of suitable emulsifiers include, but are not limited to Carbo-Tec L™ made by Climax; and Carbomul™, Carbomul HT™ and TEQ-MUL™, all made by Aquaness Chemical; and the like. Oxidized tall oil fatty acid emulsifiers must be activated by lime (calcium hydroxide).

The filtration control agent is an additive to the oil-based fluid system that provides positive leak-off control after bridging has occurred. They may include, but are not necessarily limited to oxidized asphalts, gilsonite or amine-treated lignite. Specific examples of suitable filtration control agents include, but are not limited to Carbo-Trol™, Carbotrol HT™, both made by Baker Hughes INTEQ or Carbo-Trol A-9, made by Venture Chemical.

Various other additives and agents may also be employed in the oil-based fluid systems of this invention, if necessary or desired. For example, surfactants may be employed to assist in oil wetting and suspension of a particular particulate salt in the oil. Suitable surfactants may include, but are not necessarily limited to dodecyl amine sulfonate. Specific examples of suitable surfactants include, but are not limited to Surfcote™, a dodecyl amine sulfonate made by Aquaness Chemical. Other types of additives which may be suitable include, but are not necessarily limited to, corrosion inhibitors, scale inhibitors, and other common additives.

The fluid loss system of this invention provides a filter cake which does not have to be removed from the wall of the formation or from prepacked perforations before gravel packing. The filter cake will be removed or rendered non-damaging upon producing the well.

The invention will now be further described by the use of the following non-limiting Examples which are merely illustrative without being restrictive.

EXAMPLE 1

An oil-based fluid/mud system of this invention was assembled as described in Table I-A.

TABLE I-A

Compositions of Oil-Based Fluid Sytems
(quantities per 350 cc bbl equivalent)

| Component | (Inventive) Example 1 |
|---|---|
| ISO-TEQ, cc | 264.8 |
| Saturated sodium chloride brine, cc | 66.2 |
| Carbo-Mul (secondary oil-in-water emulsifier), cc | 8 |
| Carbo-Tec L (primary oil-in-water emulsifier), cc | 8 |
| Lime (calcium hydroxide), g | 5 |
| Surfcote (oil wetting agent), cc | 3 |
| Carbo-Gel (viscosifying and gelling agent), g | 4 |

To the above formulation, 50 g of Watesal A (sized salt up to 72 μm) and 50 g of Brinewate Superfine (sized salt up to 44 μm) was added for bridging purposes. The 50 g each of fine and medium particle size salt used in the formulation of Example 1 is illustrative of the bridging action that can be obtained, but, as noted, these concentrations and particle size relationships are not limited to these.

The rheological, filtration and return oil permeability properties of the Example 1 fluid are as follows:

TABLE I-B

Properties of the Example 1 Fluid

Density - 8.25 lbs/gal
Rheological Properties

| Test Temperature | 120° F. |
|---|---|
| 600 rpm, rdg | 45 |
| 300 rpm, rdg | 29 |
| 200 rpm, rdg | 24 |
| 100 rpm, rdg | 17 |
| 59 rpm, rdg | 14 |
| 6 rpm, rdg | 7 |
| 3 rpm, rdg | 6 |
| Plastic viscosity (PV), cp | 16 |
| Yield point (YP), lb/100 sq. ft. | 13 |

Static Filtration 500 psi, 75° F., 1 darcy ceramic disc

| Spurt Loss (1 min.) | 5.2 cc |
|---|---|
| Total 30 min. Loss | 6.5 cc |
| Return Oil Permeability | 81% |

140–270 sand pack, at 500 psi, 225° F.
Dow Corning 200 cP oil
Lubricity

Measured on a Baroid Lubricity Tester with metal ring and block

| Fluid System | Coefficient of Friction |
|---|---|
| Oil Emulsion of Ex. 1 | 0.06 |
| Conventional Brine System | 0.21 |

Fluids of Examples 2, 3 and 4 were prepared similarly to that of Example 1, and the formulations and properties are given in Tables II, III and IV, respectively. Note that in Example 2, Conoco's LVT mineral oil was used as the base oil instead of ISO-TEQ. Also, in Example 4, the internal water phase of the fluid was saturated with calcium chloride, and then weighted with calcium bromide to illustrate that two different salts may be used.

TABLE II

Example 2 - Preparation of Oil Emulsion
Weighted to 10.0 lb/gal with Calcium Chloride Powder

| Composition per 42 gal/bbl (80:20 oil:water ratio) | Example 2 |
|---|---|
| Conoco LVT Mineral Oil | 31.8 gal |
| 11.7 lb/gal CaCl$_2$ brine | 7.9 gal |
| Carbo-Tec L (primary emulsifier) | 0.96 gal |
| Carbo-Mul (secondary emulsifier) | 0.96 gal |
| Lime Hydrate - Ca(OH)$_2$ | 5 lbs |
| Carbo-Gel (suspending additive) | 5 lbs |
| Carbo-Trol (filtration control additive) | 5 lbs |
| Powdered Calcium Chloride (CaCl$_2$) | 189 lbs |

Density - 10.0 lbs./gal
Rheological Flow Properties

| Test Temperature | 120° F. |
|---|---|
| 600 rpm, rdg | 60 |
| 300 rpm, rdg | 33 |
| 200 rpm, rdg | 23 |
| 100 rpm, rdg | 13 |
| 59 rpm, rdg | 9 |
| 6 rpm, rdg | 2.5 |
| 3 rpm, rdg | 2.5 |

TABLE III

Example 3 - Preparation of Oil Emulsion
Weighted to 10.1 lb/gal with Calcium Bromide Powder

| Composition per 42 gal/bbl (80:20 oil:water ratio) | Example 3 |
|---|---|
| ISO-TEQ Oil (Olefin Isomer) | 31.8 gal |
| 15.1 lb/gal CaBr$_2$ brine | 7.9 gal |
| Carbo-Tec L (primary emulsifier) | 0.96 gal |

TABLE III-continued

Example 3 - Preparation of Oil Emulsion
Weighted to 10.1 lb/gal with Calcium Bromide Powder

| | | |
|---|---|---|
| Carbo-Mul (secondary emulsifier) | | 0.96 gal |
| Lime Hydrate - Ca(OH)$_2$ | | 5 lbs |
| Carbo-Gel (suspending additive) | | 5 lbs |
| Carbo-Trol (filtration control additive) | | 5 lbs |
| Powdered Calcium Bromide (CaBr$_2$) | | 126 lbs |
| Density - 10 lb/gal | Before | After Heat Aging |
| Rheological Flow Properties | Heat Aging | at 300° F., 16 hours |
| Test Temperature, °F. | 120 | 120 |
| 600 rpm, rdg | 55 | 72 |
| 300 rpm, rdg | 31 | 40 |
| 200 rpm, rdg | 22 | 28 |
| 100 rpm, rdg | 12 | 16 |
| 59 rpm, rdg | 7.5 | 10.5 |
| 6 rpm, rdg | 2 | 2.5 |
| 3 rpm, rdg | 2 | 2 |
| Filtration Properties | | |

Conditions: 75° F.

500 psi differential
500 md berea core
Filtration:

| | Before Aging | After Aging |
|---|---|---|
| 1 minute spurt | 0.0 cc | 0.0 cc |
| 30 minute loss | 0.3 cc | 0.8 cc |

TABLE IV

Example 4 - Preparation of Oil Emulsion
Weighted to 12.3 lb/gal with Calcium Bromide Powder

| Composition per 42 gal/bbl (80:20 oil:water ratio) | Example 4 | |
|---|---|---|
| ISO-TEQ Oil (Olefin Isomer) | 31.8 gal | |
| 11.7 lb/gal CaCl$_2$ brine | 7.9 gal | |
| Carbo-Tec L (primary emulsifier) | 0.96 gal | |
| Carbo-Mul (secondary emulsifier) | 0.96 gal | |
| Lime Hydrate - Ca(OH)$_2$ | 5 lbs | |
| Carbo-Gel (suspending additive) | 5 lbs | |
| Carbo-Trol (filtration control additive) | 5 lbs | |
| Powdered Calcium Bromide (CaBr$_2$) | 475 lbs | |
| Density - 12.3 lb /gal | | |
| Rheological Flow Properties | | |
| Initial Flow Properties | | |
| Test Temperature, °F. | 120 | |
| 600 rpm, rdg | OS | Note: OS = off scale |
| 300 rpm, rdg | 250 | |
| 200 rpm, rdg | 182 | |
| 100 rpm, rdg | 110 | |
| 59 rpm, rdg | 77 | |
| 6 rpm, rdg | 29 | |
| 3 rpm, rdg | 18 | |
| Filtration Properties | | |

Conditions: 75° F.

500 psi differential
800 md berea core
Filtration:

| | | |
|---|---|---|
| 1 minute spurt | 1.0cc | |
| 30 minute loss | 4.0cc | |

Since the fluids of the invention are oil-based, it is expected that the fluids will have densities ranging from about 8.0 lb/gal to about 14 lb/gal. Further, the oil-based fluid systems of the present invention are expected to be stable at temperatures up to about 450° F.

Many modifications may be made in the composition and implementation of this invention without departing from the spirit and scope thereof which are defined only in the appended claims. For example, the exact components and proportions may be different from those used here and the graded salt may have a different exact size distribution than those used in these examples.

| GLOSSARY | |
|---|---|
| Brinewate Superfine ™ | A sized sodium chloride salt up to 44 μm available from TBC-Brineadd. |
| Carbo-Gel ™ | An amine-treated hectorite clay made by National Lead Corp. |
| Carbo-Mul HT ™ | A polyamide made by Aquaness Chemical. |
| Carbo-Tec L ™ | An oxidized tall oil fatty acid made by Climax Molybdenum Co. |
| Carbo-Trol ™ | An oxidized asphalt made by Baker Hughes INTEQ. |
| ISO-TEQ ™ | A non-toxic, biodegradable olefin isomer fluid sold by Baker Hughes INTEQ. |
| LVT-200 ™ | Low viscosity mineral oil marketed through Conoco Inc. |
| Perfflow ® | A drilling completion fluid especially formulated to control fluid loss in low to high permeable sands and provide a filter cake that can easily and effectively be removed by the produced fluid without acidizing or breaker treatment. |
| rdg | Shear stress units given on the Fann or OFI viscometer; the values are in centipoise (cP) only at 300 rpm. |
| Surfcote ™ | A dodecyl amine sulfonate made by Aquaness Chemical. |
| Watesal A ™ | A sized sodium chloride salt up to 72 μm available from TBC-Brineadd. |

We claim:

1. An oil-based fluid system for controlling fluid losses during hydrocarbon recovery operations, comprising:

an oil;

a distribution of salt particle sizes, where the salt is selected from the group consisting of alkali metal salts and alkali earth metal salts;

a suspending agent for suspending the salt particles in the oil; and a filtration control agent.

2. The oil-based fluid system of claim 1 where the fluid system further comprises a surfactant to assist in oil wetting and suspension of the salt particles.

3. The oil-based fluid system of claim 1 where the salt is a calcium salt.

4. The oil-based fluid system of claim 1 where the fluid system has a density ranging from about 8.0 lb/gal to about 14 lb/gal and is stable at a temperature up to about 450° F.

5. The oil-based fluid system of claim 1 where the system contains from about 25 to about 800 lbs/bbl salt particles and further comprises saturated brine in a proportion up to about 60 vol. %; and further comprises an emulsifier in a proportion up to about 3gal/bbl.

6. The oil-based fluid system of claim 1 where the salt is selected from the group consisting of sodium chloride, sodium bromide, potassium chloride, potassium bromide, calcium chloride, and calcium bromide.

7. An oil-based fluid system for controlling fluid losses during hydrocarbon recovery operations, comprising:

a water-in-oil emulsion, having
saturated brine;
an oil; and
an emulsifier; and a distribution of salt particle sizes, where the salt is selected from the group consisting of alkali metal salts and alkali earth metal salts;

a suspending agent for suspending the salt particles in the oil; and a filtration control agent.

8. The oil-based fluid system of claim 7 where the salt is a calcium salt.

9. The oil-based fluid system of claim 7 where the fluid system has a density ranging from about 8.0 lb/gal to about 14 lb/gal and is stable at a temperature up to about 450° F.

10. The oil-based fluid system of claim 7 wherein the system comprises from about 10 to about 60 vol. % saturated brine; and from about 25 to about 800 lbs/bbl salt particles; and further comprising an emulsifier in a proportion up to about 3 gal/bbl.

11. The oil-based fluid system of claim 7 where the salt is selected from the group consisting of sodium chloride, sodium bromide, potassium chloride, potassium bromide, calcium chloride, and calcium bromide.

12. A method of protecting a well bore during a hydrocarbon recovery operation and controlling fluid losses during such operation, comprising:

injecting an oil-based fluid system for controlling fluid losses during hydrocarbon recovery operations into the well bore, said well bore having a surface, said fluid system comprising:
an oil;
a distribution of salt particle sizes, where the salt is selected from the group consisting of alkali metal salts and alkali earth metal salts;
a suspending agent for suspending the salt particles in the oil; and
a filtration control agent;

permitting the fluid system to set up a filter cake on the surface of the well bore;

conducting the hydrocarbon recovery operation within the well bore; and removing the filter cake from the well bore.

13. The method of claim 12 where the oil-based fluid system further comprises a surfactant to assist in oil wetting and suspension of the salt particles.

14. The method of claim 12 where the salt in the oil based fluid system is a calcium salt.

15. The method of claim 12 where the oil based fluid system has a density ranging from about 8.0 lb/gal to about 14 lb/gal and is stable at a temperature up to about 450° F.

16. The method of claim 12 where the oil based fluid system contains from about 25 to about 800 lbs/bbl salt particles and further comprises saturated brine in a proportion up to about 60 vol. %; and further comprises an emulsifier in a proportion up to about 3 gal/bbl.

17. The method of claim 12 where the salt in the oil-based fluid system is selected from the group consisting of sodium chloride, sodium bromide, potassium chloride, potassium bromide, calcium chloride, and calcium bromide.

18. A method of protecting a well bore during a hydrocarbon recovery operation and controlling fluid losses during such operation, comprising:

injecting an oil-based fluid system for controlling fluid losses during hydrocarbon recovery operations into the well bore, said well bore having a surface, said fluid system comprising:
a water-in-oil emulsion, having
saturated brine;
an oil; and
an emulsifier; and
a distribution of salt particle sizes, where the salt is selected from the group consisting of alkali metal salts and alkali earth metal salts;
a suspending agent for suspending the salt particles in the oil; and
a filtration control agent;

permitting the fluid system to set up a filter cake on the surface of the well bore;

conducting the hydrocarbon recovery operation within the well bore; and removing the filter cake from the well bore.

19. The method of the claim 18 where the well bore is in a formation having a permeability, and where the permeability of the formation prior to injecting the fluid system is $K_i$ and the permeability of the formation after removing the filter cake from the well bore is $K_f$, and where $K_f/K_i$ ranges from 0.5 to 1.0.

20. The method of claim 18 where the salt in the oil-based fluid system is a calcium salt.

21. The method of claim 18 where the oil-based fluid system has a density ranging from about 8.0 lb/gal to about 14 lb/gal and is stable at a temperature up to about 450° F.

22. The method of claim 18 where the oil-based fluid system comprises from about 10 to about 60 vol. % saturated brine; and from about 25 to about 800 lbs/bbl salt particles; and further comprising an emulsifier in a proportion up to about 3 gal/bbl.

23. The method of claim 18 where the salt in the oil-based fluid system is selected from the group consisting of sodium chloride, sodium bromide, potassium chloride, potassium bromide, calcium chloride, and calcium bromide.

* * * * *